US008720262B2

(12) United States Patent
Windlin

(10) Patent No.: US 8,720,262 B2

(45) Date of Patent: May 13, 2014

(54) TESTING A SPEED LIMITING SYSTEM OF AN ELEVATOR INSTALLATION

(75) Inventor: Walter Windlin, Ennetmoos (CH)

(73) Assignee: Inventio AG, Hergiswil (CH)

( * ) Notice: Subject to any disclaimer, the term of this patent is extended or adjusted under 35 U.S.C. 154(b) by 183 days.

(21) Appl. No.: 13/412,054

(22) Filed: Mar. 5, 2012

(65) Prior Publication Data

US 2012/0227479 A1 Sep. 13, 2012

(30) Foreign Application Priority Data

Mar. 9, 2011 (EP) .................................... 11157410

(51) Int. Cl.
*G01M 19/00* (2006.01)

(52) U.S. Cl.
USPC ........................................................... 73/121

(58) Field of Classification Search
USPC .................................. 73/1.37, 121, 129, 488
See application file for complete search history.

(56) References Cited

U.S. PATENT DOCUMENTS

| | | | | |
|---|---|---|---|---|
| 4,653,612 | A * | 3/1987 | Winkler | 187/374 |
| 5,717,175 | A * | 2/1998 | Liebtrau et al. | 187/393 |
| 5,950,768 | A * | 9/1999 | Gensike et al. | 187/376 |
| 6,202,795 | B1 * | 3/2001 | Bluteau | 187/288 |
| 6,253,879 | B1 * | 7/2001 | Skalski et al. | 187/287 |
| 7,658,268 | B2 * | 2/2010 | Kinpara et al. | 187/293 |
| 7,954,604 | B2 * | 6/2011 | Mishima | 187/293 |
| 2006/0237265 | A1 * | 10/2006 | Eckenstein et al. | 187/391 |

FOREIGN PATENT DOCUMENTS

JP 2003118948 A 4/2003

* cited by examiner

*Primary Examiner* — Eric S McCall

(74) *Attorney, Agent, or Firm* — Fraser Clemens Martin & Miller LLC; William J. Clemens

(57) ABSTRACT

In a method or a test device for testing a speed limiting system of an elevator installation, in which speed limiting system in normal operation on occurrence of an impermissible movement state of an elevator cage a cage brake device is activated in that a limiter traction means connected with a trigger mechanism of the cage brake device is braked by a speed limiter, whereby the trigger mechanism of the cage brake device is actuated against a trigger resistance force, the limiter traction means is, when the test is performed, operatively connected with the trigger mechanism by way of a test device, wherein the test device has the effect that for overcoming the trigger resistance force of the trigger mechanism a greater traction force is required in the limiter traction means than when the limiter traction means is directly connected with the trigger mechanism.

18 Claims, 4 Drawing Sheets

(View A)

TESTING A SPEED LIMITING SYSTEM OF AN ELEVATOR INSTALLATION

CROSS-REFERENCE TO RELATED APPLICATION

This application claims priority to European Patent Application No. 11157410.9, filed Mar. 9, 2011, which is incorporated herein by reference.

FIELD

The disclosure relates to testing a speed limiting system of an elevator installation.

BACKGROUND

Passenger or goods elevators usually have a speed limiting system which comprises at least one cage brake device and a so-termed speed limiter. The purpose of the speed limiting system consists, in the case of occurrence of an impermissibly high speed and/or impermissibly high acceleration of an elevator cage, of bringing the elevator cage to a standstill through braking by means of the cage brake device. The cage brake device is fastened to the elevator cage and comprises a trigger mechanism which is operatively connected with the speed limiter, which is installed in the elevator installation to be non-displaceable. The speed limiter detects the speed and/or acceleration of the elevator cage by way of this operative connection. If the speed limiter detects an impermissibly high speed and/or an impermissibly high acceleration of the elevator cage the speed limiter activates the trigger mechanism of the cage brake device by way of the said operative connection, whereby the elevator cage is braked.

The terms "impermissibly high speed" and "impermissibly high acceleration" are substituted in the following by the term "impermissible movement state". Moreover, the designation "speed limiter" is used for devices which detect either an impermissibly high speed or an impermissibly high acceleration or detect both an impermissibly high speed and an impermissibly high acceleration.

The operative connection between the trigger mechanism, which moves synchronously with the elevator cage, of the cage brake device and the speed limiter usually comprises a flexible limiter traction means. Wire cables are possibly used as limiter traction means. However, other flexible traction means, for example synthetic fiber cables, belts or link chains, are also usable. The limiter traction means forms a traction means loop which runs around an upper and a lower limiter traction means roller. These limiter traction means rollers are so arranged that a point of the limiter traction means is movable along the entire movement of the elevator cage and parallel thereto. This point of the limiter traction means is connected with the trigger mechanism of the cage brake device so that the movement of the elevator cage is transmitted by way of the limiter traction means to the limiter traction means rollers and to the speed limiter coupled with one of the limiter traction means rollers. The speed limiter comprises means for detection of the speed and/or the acceleration of the limiter traction means and thus the elevator cage. In addition, the speed limiter comprises means for braking the limiter traction means, which on occurrence of an impermissible movement of the limiter traction mean or of the elevator cage brakes the movement of the limiter traction means by limited braking force. This can be effected, for example, in that the speed limiter blocks or brakes one of the traction means rollers around which the limiter traction means runs or in that a brake device, which acts directly on the limiter traction means, of the speed limiter is activated.

After braking of the limiter traction means produced by the speed limiter as a consequence of an impermissible movement state of the elevator cage, the elevator cage and the trigger mechanism, which is connected with the limiter traction means, of the cage brake device continue to move. As a consequence, a traction force builds up in the braked or stationary limiter traction means and acts as a trigger force on a trigger element which forms part of the trigger mechanism of the cage brake device. This trigger force of the limiter traction means causes triggering of the trigger mechanism and thus activation of the cage brake device, whereupon the cage brake device brakes the moved elevator cage and brings it to a stop.

In order to actuate the trigger mechanism a trigger resistance force of the trigger mechanism has to be overcome by the limiter traction means. This trigger resistance force is set so that the accelerations, which in elevator operation arise at the elevator cage, are transmissible by way of the trigger mechanism to the limiter traction means and the speed limiter. Elevator standards and safety specifications often contain prescriptions with respect to the ratio between the resistance trigger force which is to be overcome at the trigger mechanism and the braking force transmissible as a minimum by the speed limiter to the limiter traction means. For example, elevator standard EN 81 requires the braking force transmissible by the speed limiter to the limiter traction means to correspond with at least double the trigger resistance force required for actuation of the trigger mechanism of the cage brake device. In order to help ensure that the trigger mechanism and the cage brake device in a case of an impermissible movement of the elevator cage are in fact also activated, the limiter traction means is thus not to slip through on the limiter traction means roller blocked by the speed limiter or in the activated brake device, which acts on the limiter traction means, of the speed limiter as long as the traction force present in the limiter traction means is less than double the trigger resistance force required for actuation of the trigger mechanism.

In practice it can be difficult and complicated to adduce evidence that under realistic operating conditions the braking force transmissible by the speed limiter to the limiter traction means corresponds with at least double the effectively occurring trigger resistance force of the trigger mechanism of the cage brake device.

SUMMARY

At least some embodiments of the present disclosure comprise an economic, safe and simply performable method as well as a corresponding test device which serve the purpose of testing a speed limiting system of an elevator installation, which speed limiting system comprises a limiter traction means which is capable of braking and which in normal operation is directly connected with a trigger mechanism of a cage brake device, wherein in normal operation the cage brake device is activated in the manner that the limiter traction means is braked by the speed limiter when the elevator cage is moving, whereby the trigger mechanism of the cage brake device is actuated against a trigger resistance force of the trigger mechanism.

In at least some cases, the method or the test device can produce proof at an installed elevator installation that the braking force transmissible by the speed limiter to the limiter traction means is sufficient in order to guarantee that the limiter traction means arrested by the speed limiter can with the requisite reliability actuate the trigger mechanism of the cage brake device against the trigger resistance force of the trigger mechanism.

Some embodiments comprise a method of testing a speed limiting system of an elevator installation, in which speed limiting system in normal operation on occurrence of an impermissible movement state of the elevator cage a cage brake device is activated in that a limiter traction means connected with a trigger mechanism of the cage brake device is braked by a speed limiter, whereby the trigger mechanism of the cage brake device is actuated against a trigger resistance force of the trigger mechanism, wherein on performance of the test the limiter traction means is connected with the trigger mechanism by way of a test device which has the effect that for overcoming the trigger resistance force of the trigger mechanism a greater traction force is required in the limiter traction means than when the limiter traction means is directly connected with the trigger mechanism.

In further embodiments, a test device comprises a first force transmission point by way of which for performance of the test the test device is connected with the limiter traction means and a second force transmission point by way of which the test device co-operates with the trigger mechanism of the cage brake device. The test device has the effect that for overcoming the trigger resistance of the trigger mechanism a greater traction force is required in the limiter traction means when the limiter traction means at the time of performance of the test acts not directly on the trigger mechanism, but on the trigger mechanism by way of the test device.

In further embodiments, for performance of the test of the speed limiting system use is made of a test device which has the effect that the traction force required in the limiter traction means for overcoming the trigger resistance force of the trigger mechanism of the cage brake device is increased.

In additional embodiments, the method in the performance of the test a connection, which is present in normal operation, between the limiter traction means and the trigger mechanism is separated and the test device is installed so that a first force transmission point of the test device is connected with the limiter traction means and a second force transmission point of the test device co-operates with the trigger mechanism. A simple and time-saving test method with an economic and easily transportable test device can thus be realized.

In some embodiments, the method or the test device the speed limiter, in the case of performance of the test, is caused—for example by an elevator engineer—to brake the limiter traction means while the elevator cage together with the cage brake device and the trigger mechanism is disposed in motion, whereby the trigger mechanism of the cage brake device and thus the cage brake device are actuated by the limiter traction means by way of the test device insofar as a traction means braking force, which corresponds at least with the traction force increased by the test device and required in the limiter traction means for actuation of the trigger mechanism, is produced in the limiter traction means by the speed limiter. Evidence can thus be produced by an economic test device in simple and reliable manner that the speed limiter can brake the limiter traction means with sufficient strength in order to ensure that the cage brake device can still be reliably actuated even in the case of occurrence of a somewhat increased trigger resistance force of the trigger mechanism.

According to one of the possible forms of embodiment of the method the trigger mechanism of a cage brake device comprises a trigger lever which is pivotable about an axis of rotation and which is deflected out of a normal setting by the components, which act on the trigger mechanism, of the test device against the trigger resistance force of the trigger mechanism in order to actuate the cage brake device.

According to one of the possible forms of embodiment of the method or of the test device the test device comprises a deflecting roller, wherein for performance of the test the rotational axle of the deflecting roller is connected with the limiter traction means and a flexible test traction means is guided over the deflecting roller, wherein a first end of the test traction means is connected with the trigger mechanism of the cage brake device or with the trigger lever of a trigger mechanism and a second end of the test traction means is fastened to fixing point of the elevator installation. Such a form of embodiment of the test method helps ensure simple handling and that the test device can be produced economically and transported in simple manner.

According to one of the possible forms of embodiment of the method or of the test device the deflecting roller of the testing devices is, for performance of the test, mounted in or on a traction means coupling which is a component which connects the two ends of the limiter traction means together and in normal operation forms a connection between the limiter traction means and the trigger lever of the trigger mechanism. The test method can thereby be performed very simply and the test device requires a minimum outlay.

According to one of the possible forms of embodiment of the method or of the test device the test device comprises a test trigger lever which for performance of the test is pivotably fastened in the vicinity of the trigger lever of the trigger mechanism, wherein the test trigger lever is connected with the limiter traction means in place of the trigger lever and the test trigger lever is brought directly or by way of a transmission element for co-operation with the trigger lever in such a manner that for deflection of the trigger lever against the trigger resistance force of the trigger mechanism a greater traction force is required in the limiter traction means when the limiter traction means is not directly connected with the trigger lever 12 of the trigger mechanism 11, but acts on the trigger mechanism by way of the test trigger lever. This form of embodiment of the method or of the test device can enable a particularly quick and problem-free performance of the test, since mounting of the test trigger lever and coupling of the limiter traction means to the test trigger lever instead of to the trigger lever of the trigger mechanism can be performed by a few actions.

According to one of the possible forms of embodiment of the method or of the test device the traction force required for deflection of the two trigger levers in the limiter traction means connected with the test trigger lever for the test is settable in that the point of the force transmission between the test trigger lever and the trigger lever of the trigger mechanism is displaceable. Thus, a desired ratio is also settable between the traction force which is required in the limiter traction means connected with the test trigger lever for actuation of the trigger mechanism in the case of the test and the traction force which is required in the limiter traction means connected directly with the trigger lever of the trigger mechanism for actuation of the trigger mechanism in normal operation. This form of embodiment of the method or of the test device enables, by economic means which are usable in simple manner, a variation of the traction force required in the limiter traction means at the time of the test for actuation of the cage brake device.

According to one of the possible forms of embodiment of the method or of the test device a transmission roller or a transmission pin or a pivot lever is used as transmission element between the test trigger lever and the trigger lever of the trigger mechanism. These forms of embodiment can enable a rapid and uncomplicated application of the test trigger lever forming the test device.

BRIEF DESCRIPTION OF THE DRAWINGS

Exemplifying embodiments of disclosed technologies are explained in the following by way of the accompanying drawings. The same elements in the figures are in that case provided with the reference numerals.

DETAILED DESCRIPTION

Figure 1:
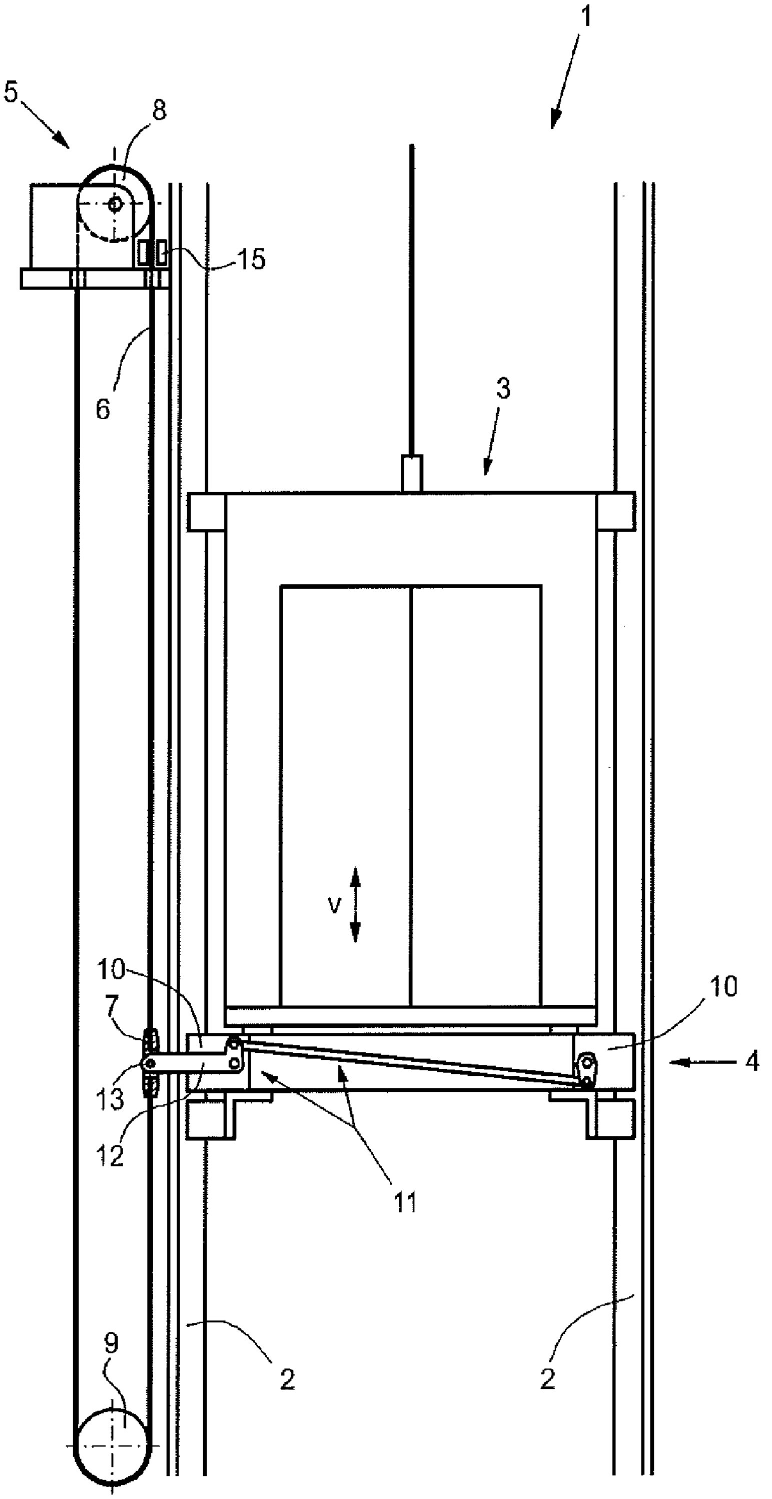
FIG. 1 shows a detail of an elevator installation in normal operation, comprising an elevator cage with a cage brake device and a trigger mechanism for actuating the cage brake device. Also illustrated is a speed limiting system with a speed limiter and a limiter traction means by way of which the speed limiter acts on the trigger mechanism of the cage brake device.

FIG. 1 shows a detail of an elevator installation 1 which is suitable for use of at least some embodiments of the disclosed methods or of at least some embodiments of the test device for testing a speed limiting system. The elevator installation 1 comprises an elevator cage guided at guide rails 2 as well as a speed limiting system with a cage brake device 4, a speed limiter 5, a flexible limiter traction means 6 and a traction means coupling 7.

The speed limiter 5, the function of which was already described in the foregoing, is driven by the flexible limiter traction means 6, the ends of which are connected together by way of a traction means coupling 7 to form an endless traction means loop. The limiter traction means 6 is guided over an upper limiter traction means roller 8 associated with the speed limiter 5 and a lower traction means roller 9. The extended sections of the limiter traction means 6 extend parallel to the movement of the elevator cage 3. One of the extended sections of the limiter traction means 6 is coupled with the movement of the elevator cage 3 by way of the trigger lever 12 of the trigger mechanism 11 of the cage brake device 4.

The cage brake device 4 arranged at the elevator cage 3 and comprising two brake units 10 is activated by way of the trigger mechanism 11, which comprises a trigger lever 12. A deflection of the trigger lever 12 from its middle setting has the effect that the two brake units 10 are brought into a state in which they so co-operate with the guide rails 2 that the moved elevator cage 3 is braked and subsequently held. The trigger lever 12 is pivotably connected with the cage brake device 4 and thus with the elevator cage 3 and centered in yielding manner in its center position, wherein for deflection of the trigger lever 12 a trigger resistance force has to be overcome. One end of the trigger lever 12 is pivotably connected with the traction means coupling 7 of the limiter traction means 6 by means of a pin 13.

During normal operation the limiter traction means 9 is moved synchronously with the movement of the elevator cage 3 by the trigger lever 12 centered in yielding manner in its center position. When an impermissible movement state of the elevator cage 3 in upward travel direction and/or in downward travel direction arises this impermissible movement state is transmitted to the limiter traction means 6 and thus to the limiter traction means roller 8 associated with the speed limiter 5. If the speed and/or the acceleration of the elevator cage 3 exceeds or exceed a specific limit value this impermissible movement state is detected by the speed limiter 5, whereupon the speed limiter 5 blocks or brakes the upper limiter traction means roller associated with it or activates a traction means brake 15 which is associated with it and acts directly on the limiter traction means 6. This has the consequence that the limiter traction means 6 running over the upper limiter traction means roller 8 is braked, whilst the elevator cage 3 together with the cage brake device 4 and the trigger lever 12 connected with the limiter traction means 6 continue to move. A traction force acting on the trigger lever 12 is thereby built up in the limiter traction means 6, which force deflects the trigger lever of the trigger mechanism 11 of the cage brake device 4 against a trigger resistance force and thus actuates the cage brake device 4 insofar as the condition is fulfilled that the traction means braking force transmissible by the blocked upper limiter traction means roller 8 or the activated traction means brake 15 by means of friction to the limiter traction means 6 is sufficient to overcome the trigger resistance force of the trigger mechanism 11. The forms of embodiment, which are described in the following, of the test devices and test methods can serve the purpose of checking whether this condition is fulfilled with sufficient reliability in an elevator installation to be tested.

Figure 2:
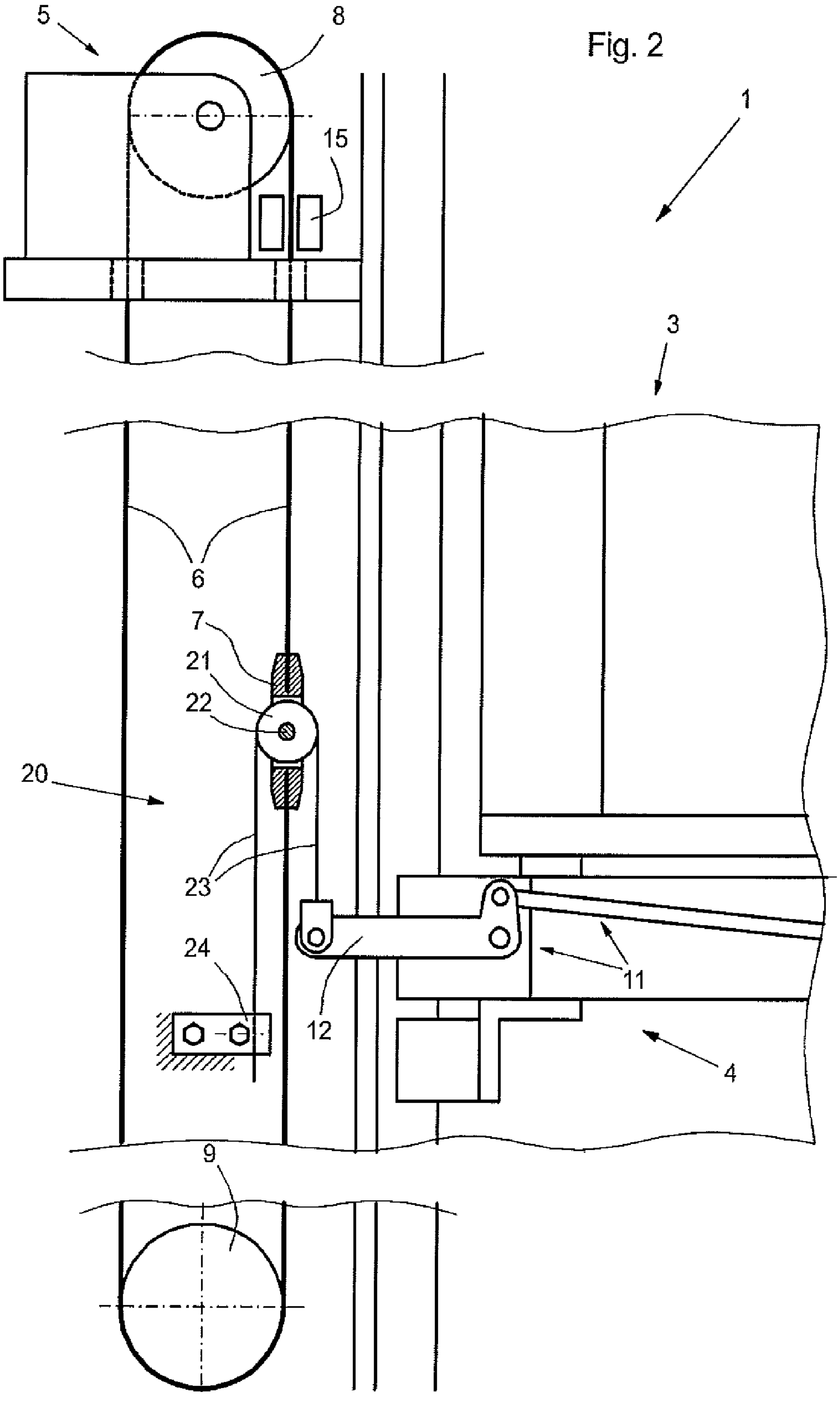
FIG. 2 shows an enlarged detail of the elevator installation according to FIG. 1 with a test device, which is installed for testing the speed limiting system, in accordance with a first form of embodiment.

FIG. 2 shows an enlarged detail of the elevator installation 1 according to FIG. 1, but with an installed test device 20, which is suitable for performance of the test method, in a first form of embodiment. This test device 20 comprises a deflecting roller 21, the rotational axle 22 of which is, for performance of the test, fixed in the traction means coupling 7 in place of the trigger lever 12, so that the deflecting roller 21 forms a first force transmission point of the test device 20, which first force transmission point is connected with the limiter traction means 6. In addition, the test device 20 comprises a flexible test traction means 23 guided over the deflecting roller 21, wherein one end of the test traction means 23 is connected with the end of the trigger lever 12 of the trigger mechanism 11 of the cage brake device 4 so that this one end of the test traction means 23 forms a second force transmission point of the test device which co-operates with the trigger mechanism 11 of the cage brake device 4. The other end of the test traction means is fixed at any desired fixed point 24 in the elevator installation 1.

For performance of the test either the upper limiter traction means roller 8 associated with the speed limiter 5 is blocked, or the traction means brake 15 associated with the speed limiter is activated, by an action of the elevator engineer carrying out the test, whereby the movement of the limiter traction means 6 is prevented by a limited traction means braking force. The elevator cage 3 and thus the trigger lever 12 of the trigger mechanism 11 are subsequently caused, for example by activating the elevator drive, to execute a downward movement. As soon as the test traction means 23 belonging to the test device 20 and guided from the trigger lever 12 over the deflecting roller 21 to the fixed point 24 is slack as a consequence of this downward movement the trigger lever 12 generates in the test traction means 23 a traction force which deflects the trigger lever as soon as this traction force exceeds the trigger resistance force of the trigger mechanism. The test traction means 23 guided over the deflecting roller 21 connected with the limiter traction means 6 in that case produces in the limiter traction means by way of a block-and-tackle effect a traction force which corresponds with double the traction force present in the test traction means 23 and thus double the trigger resistance force of the trigger mechanism. In order to overcome the trigger resistance force of the trigger mechanism 11 a traction force of twice the height is thus required in the limiter traction means 6 when the limiter traction means does not act as in normal operation directly on the trigger mechanism 11 or the trigger lever 12, but acts by way of the test device 20 on the trigger mechanism. If the traction means braking force, which is exerted on the limiter traction means 6 by the blocked upper limiter traction means roller 8 or the traction means brake 15, withstands the traction force which is transmitted by the test device 20 to the limiter traction means 6 and corresponds with double the trigger resistance force of the trigger mechanism 11 the trigger lever 12 is in this test procedure deflected against the trigger resistance force, whereby the trigger mechanism 11 is actuated and the cage brake device 4 activated. In the alternative case the limiter traction means 6 slips through on the blocked limiter traction means roller 8 or in the activated traction means brake 15 without the trigger lever 12 being deflected and the cage brake device 4 activated. In the latter case the elevator standard EN-81, which requires the traction means braking force transmissible by the speed limiter to the limiter traction means 6 to have at least a safety factor of two in relation to the traction force required in the limiter traction means 6 for actuation of the trigger mechanism of the cage brake device, would not be fulfilled in the case of the tested elevator installation.

It can be readily seen from FIG. 2 that the test device 20 illustrated here is also usable for testing a cage brake device provided for the upward travel direction of the elevator cage 3 in that for performance of the test the deflecting roller 21, which is mounted in the traction means coupling 7, for the test traction means 23 is positioned below the trigger lever 12, the test traction means 23 being guided downwardly from the trigger lever 12, through 180 degrees around the deflecting roller 21 and subsequently upwardly to the fixing point 24. The elevator cage is thereupon caused to execute an upward movement which, in the case of a limiter traction means 6, braked with sufficient strength, produces a deflection of the trigger lever 12 of the trigger mechanism 11 in downward direction and thus triggering of the cage brake device provided for the upward travel direction of the elevator cage 3.

Figure 4:
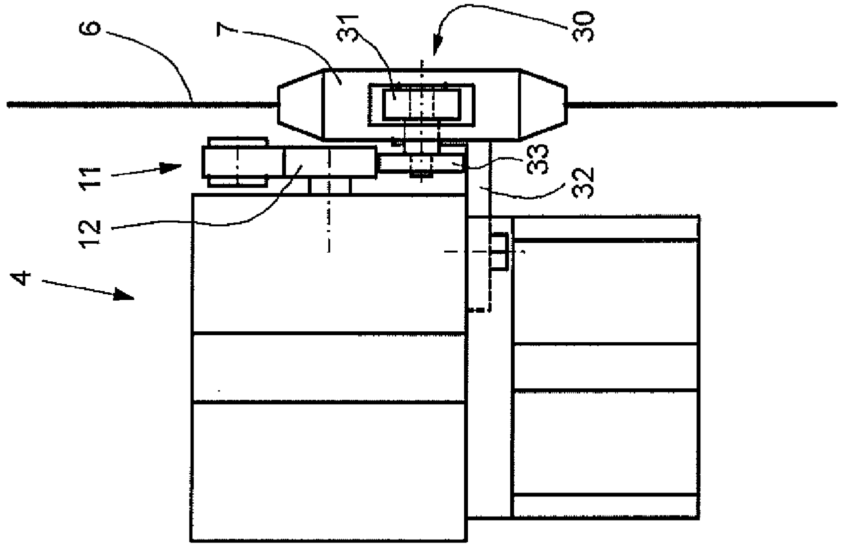
FIG. 4 shows a side view of the detail according to FIG. 3.
Figure 3:
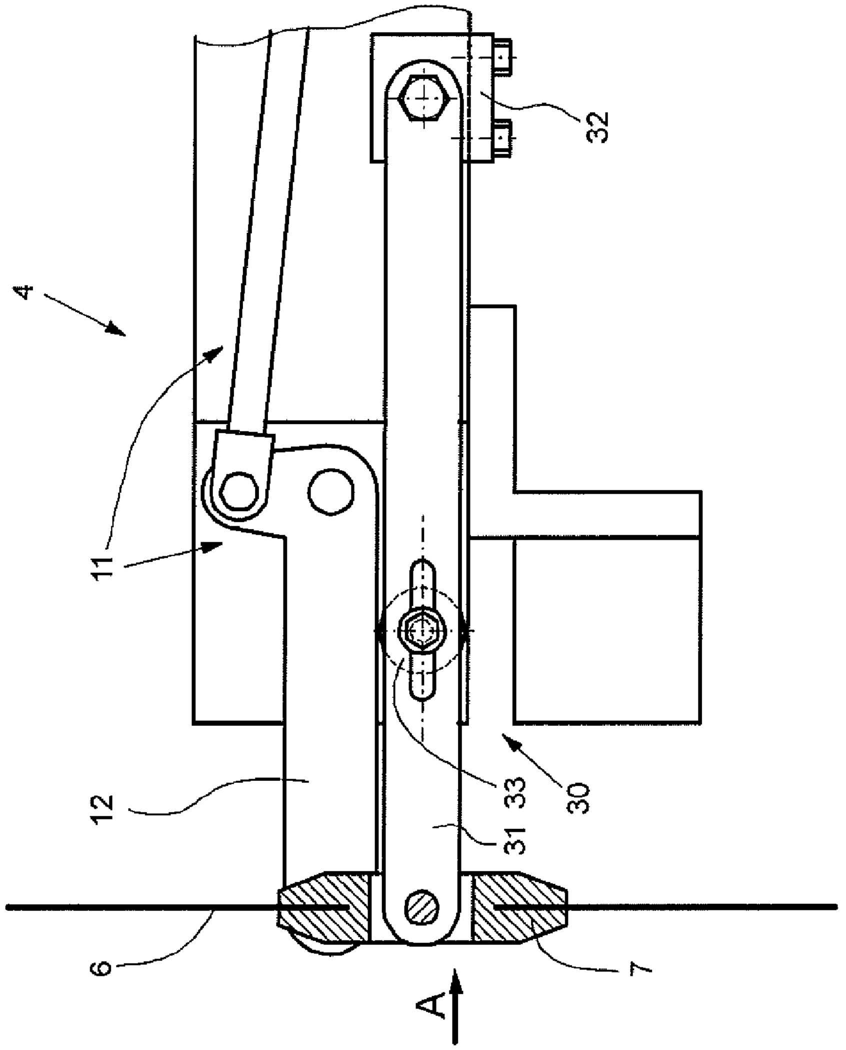
FIG. 3 shows an enlarged detail of the elevator installation according to FIG. 1 with a part of the cage brake device and the trigger mechanism as well as a test device, which is installed for testing the speed limiting system, in accordance with a second form of embodiment.

FIG. 3 shows an enlarged detail of an elevator installation according to FIG. 1, with the cage brake device 4 of the elevator cage, the trigger mechanism 11 of the cage brake device and the trigger lever 12 of the trigger mechanism. Also illustrated is a test device 30, which is installed for performance of the test method according to another embodiment. FIG. 4 shows a side view of the detail of the elevator installation according to FIG. 3 with the components, which were stated in the foregoing in connection with FIG. 3, and the installed test device 30.

The test device 30 comprises a test trigger lever 31 which is pivotably fastened at one end thereof to the elevator cage by means of a screw-connectible bearing support 32 in the region of the cage brake device 4. At its other end the test trigger lever 31 is pivotably connected with the traction means coupling 7 of the limiter traction means 6, with which traction means coupling the trigger mechanism 11 is connected in normal operation of the trigger lever 12. For performance of the test the traction means coupling 7 is so positioned that the test trigger lever 31 is oriented substantially parallel to the trigger lever 12 of the trigger mechanism 11. Laterally mounted on the test trigger lever between the pivot bearing of the test trigger lever 31 and its connecting point with the traction means coupling 7 is a transmission element in the form of a transmission roller 33 which when the test is performed transmits an upward movement of the test trigger lever 31 to the trigger lever 12 of the trigger mechanism 11. The position of the transmission roller 33 on the test trigger lever 31 is so selected that for deflection of the trigger lever 12 against the trigger resistance force of the trigger mechanism 11 by way of the test trigger lever 31 a traction force greater by a desired factor is required in the limiter traction means 6 when the limiter traction means acts not directly, but by way of the test trigger lever 31 on the trigger lever 12 of the trigger mechanism 11. In order to be able to vary the factor of this force amplification the position of the transmission roller, i.e. the point of the force transmission between the test trigger lever 31 and the trigger lever 12, is displaceable along the two trigger levers.

Also in this form of embodiment of the test device, for performance of the test either the upper limiter traction means roller 8 associated with the speed limiter 5 is blocked or the traction means brake 15 associated with the speed limiter is activated (FIGS. 1, 2) by the elevator engineer carrying out the test, whereby a movement of the limiter traction means 6 is prevented by a limited traction means braking force. The elevator cage 3 and thus the test trigger lever 31 of the trigger mechanism 11 are subsequently caused, for example by activating the elevator drive, to execute a downward movement. As a consequence of this downward movement of the test trigger lever 31 there arises in the braked limiter traction means 6 a traction force by which the test trigger lever 31 and the trigger lever 12, which is coupled with the test trigger lever by way of the transmission roller 33, of the trigger mechanism 11 are deflected upwardly against the trigger resistance force of the trigger mechanism. The trigger resistance force generates in the case of force transmission from the trigger lever 12 by way of the transmission roller 33 and the test trigger lever to the limiter traction means 6, as a consequence of the lever lengths co-operating in that case, in the limiter traction means 6 a traction force which corresponds with a desired multiple of the traction force which in normal operation with direct coupling between the limiter traction means 6 and the trigger lever 12 of the trigger mechanism is required for overcoming the trigger resistance force of the trigger mechanism 11. Thus, for actuation of the trigger mechanism 11, i.e. for activation of the cage brake device 4, a traction force is required in the limiter traction means 6 which is higher by a desired factor—when the limiter traction means in the case of performance of the test acts by way of the test device 30 described here on the trigger mechanism 11—than when the limiter traction means 6 in normal operation acts directly on the trigger mechanism 11 or the trigger lever 12. If at the time of the test the traction means braking force, which is exerted by the blocked upper limiter traction means roller 8 or the traction means brake 15 (FIGS. 1, 2) on the limiter traction means 6, withstands this increased traction force the trigger lever 12 is in this test process deflected against the trigger resistance force, whereby the trigger mechanism 11 is actuated and the cage brake device 4 activated. In the alternative case the limiter traction means 6 slips through on the blocked limiter traction means roller 8 or in the activated traction means brake 15 without deflecting the test trigger lever 31 and the trigger lever 12 and without activating the cage brake device 4. In the latter case, the desired or prescribed safety factor for reliable activation of the cage brake device would not be given for the tested elevator installation. As already mentioned, elevator standard EN-81 requires that the traction means braking force transmissible by the speed limiter to the limiter traction means 6 has to have at least a safety factor of two in relation to the traction force required in the limiter traction means for actuation of the trigger mechanism of the cage brake device.

Figure 5:
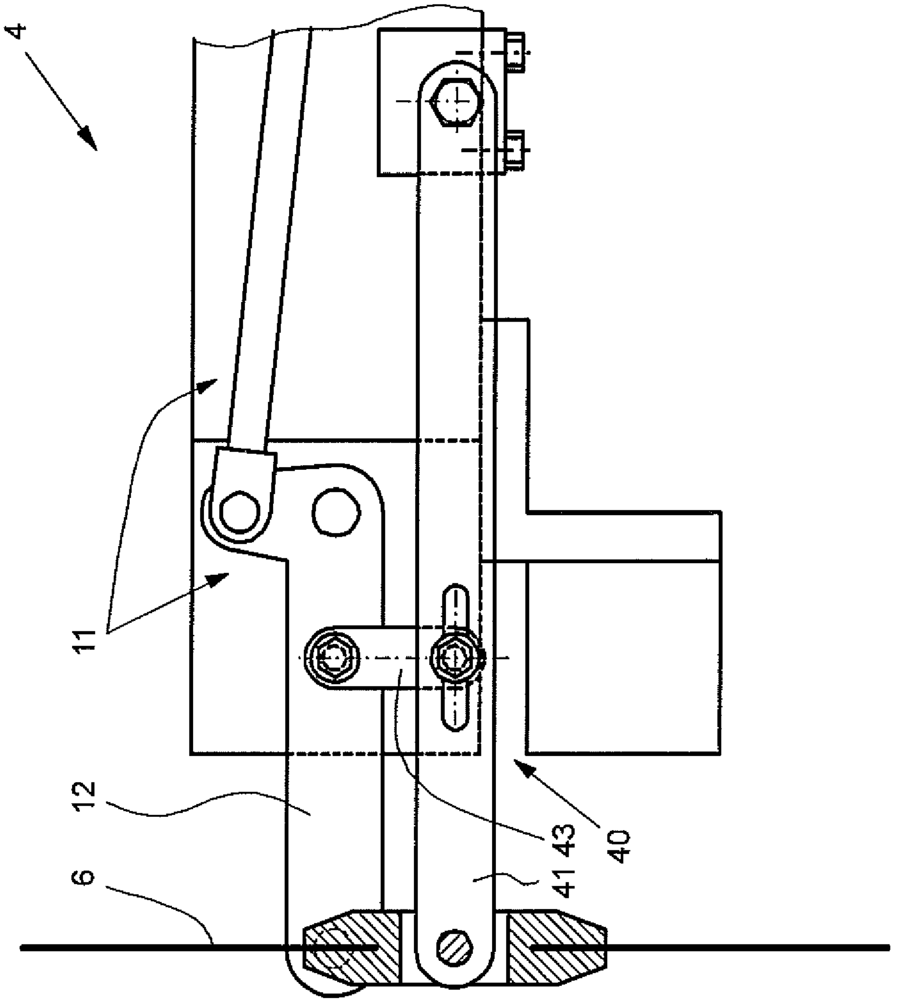
FIG. 5 shows the detail according to FIG. 3 of the elevator installation, with a test device, which is installed for testing the speed limiting system, in accordance with a third form of embodiment.

FIG. 5 in turn shows an enlarged detail of the elevator installation according to FIG. 1 with the cage brake device 4, the trigger mechanism 11 of the cage brake device and the trigger lever 12 of the trigger mechanism. Also illustrated is a test device 40, which is installed for performance of the test method in a third form of embodiment.

The form of embodiment of the test device 40 according to FIG. 5 differs from the foregoing form of embodiment of the test device 30 described in connection with FIGS. 3 and 4 in that the force transmission between the test trigger lever 41 and the trigger lever 12 of the trigger mechanism 11 takes place by way of a transmission element in the form of a pivot lever 43. The point of force transmission between the test trigger lever 41 and the trigger lever 12, i.e. the position of the pivot lever 43, is displaceable along at least one of the two trigger levers, here along the test trigger lever 41. This makes it possible to vary the factor by which the traction force, which is required for deflection of the trigger lever 12 against the trigger resistance force of the trigger mechanism 11, in the limiter traction means 6 is increased when the limiter traction means acts on the trigger mechanism not directly by way of the trigger lever 12, but by way of the test trigger lever 41.

The test device in the form of embodiment according to FIG. 5 can have the feature that with this test device the trigger lever 12 of the trigger mechanism 11 of the cage brake device 4 can be deflected both upwardly and downwardly. This test device is therefore capable of particularly simple use for the testing of a cage brake device which can brake the elevator cage in the case of impermissible movement states not only in downward travel direction, but also in upward travel direction.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. A method of testing a speed limiting system of an elevator installation, the method comprising:

coupling a test device to a limiter traction element of the elevator installation; and actuating a trigger mechanism of a cage brake device by applying a trigger resistance force to the trigger mechanism, the limiter traction element being connected to the trigger mechanism by the test device, the test device increasing the trigger resistance force compared to if the trigger mechanism were directly coupled to the limiter traction element.

2. The method of claim 1, further comprising:

separating the trigger mechanism from the limiter traction element, the coupling the test device to the limiter traction element comprising coupling a first force transmission point of the test device to the limiter traction element; and coupling a second force transmission point of the test device to the trigger mechanism.

3. The method of claim 2, the applying the trigger resistance force to the trigger mechanism comprising:

braking the limiter traction element using a speed limiter of the elevator installation; and moving the cage brake device relative to the limiter traction element.

4. The method of claim 3, the trigger mechanism comprising a trigger lever, the trigger lever being pivotable about an axis of rotation, the trigger lever being deflectable out of a normal setting by the applying of the trigger resistance force.

5. The method of claim 4, the test device comprising a test trigger lever, the test trigger lever being pivotably fastenable to an elevator cage.

6. The method of claim 5, the test trigger lever being couplable to the trigger lever of the trigger mechanism using a pivot lever in one of two or more positions, the trigger resistance force being adjustable by the position of the pivot lever.

7. The method of claim 5, the test trigger lever being couplable to the trigger lever of the trigger mechanism using a transmission roller in one of two or more positions, the trigger resistance force being adjustable by the position of the transmission roller.

8. The method of claim 5, the test trigger lever being couplable to the trigger lever of the trigger mechanism using a transmission pin in two or more positions, the trigger resistance force being adjustable by the position of the transmission pin.

9. The method of claim 8, the test device comprising:

a deflecting roller having a rotational axle; and a flexible test traction element guided at least partially around the deflecting roller, the coupling the test device to the limiter traction element comprising, coupling the deflecting roller to the limiter traction element, coupling a first end of the flexible test traction element to the trigger mechanism, and coupling a second end of the flexible test traction element to a fixing point.

10. The method of claim 9, the coupling the deflecting roller to the limiter traction element comprising mounting the deflecting roller in or on a traction element coupling, the traction element coupling being configured to connect the limiter traction element and a trigger lever.

11. A test device for testing a speed limiting system of an elevator installation, the test device comprising:

a first force transmission point coupled to a limiter traction element of the speed limiting system; and a second force transmission point coupled to a trigger mechanism of a cage brake device of the elevator installation, the test device being configured to increase a trigger resistance force of the trigger mechanism compared to if the trigger mechanism were directly coupled to the limiter traction element.

12. The test device of claim 11, further comprising:

a deflecting roller; and a flexible test traction element, the flexible test traction element being guided at least partially around the deflecting roller, the flexible test traction element comprising a first end for coupling to the trigger mechanism of the cage brake and a second end for fastening to a fixing point in the elevator installation.

13. The test device of claim 12, wherein the deflecting roller is mounted in or on a traction element coupling, wherein the traction element coupling connects two ends of the limiter traction element and connects the limiter traction element to the trigger level of the trigger mechanism.

14. The test device of claim 11, further comprising a test trigger lever pivotably fastened near a trigger lever of the trigger mechanism, and which test trigger lever is connected with the limiter traction device in place of the trigger lever of the trigger mechanism.

15. The test device of claim 14, further comprising a force transmission means coupled to the test trigger lever and to the trigger lever of the trigger mechanism, wherein the trigger resistance force of the trigger mechanism is adjusted by changing a position of the force transmission means.

16. The test device of claim 15, the force transmission means comprising a transmission roller.

17. The test device of claim 15, the force transmission means comprising a transmission pin.

18. The test device of claim 15, the force transmission means comprising a pivot lever.

* * * * *